United States Patent
Huang

[11] Patent Number: 5,924,677
[45] Date of Patent: Jul. 20, 1999

[54] DISK-TYPE FAUCET

[76] Inventor: Chao-Qun Huang, No. 12, Alley 55, Lane 461, Sec. 2, Hsing An Road, Taichung Hsien, Taiwan

[21] Appl. No.: 08/987,349

[22] Filed: Dec. 9, 1997

[51] Int. Cl.[6] .................................................... F16K 5/04
[52] U.S. Cl. ........................................... 251/304; 251/185
[58] Field of Search ..................................... 251/185, 304

[56] References Cited

U.S. PATENT DOCUMENTS

| | | | |
|---|---|---|---|
| 3,212,752 | 10/1965 | Kast | 251/185 X |
| 4,073,471 | 2/1978 | Lehtinen | 251/185 X |
| 4,700,736 | 10/1987 | Sheen | 251/185 X |
| 4,924,903 | 5/1990 | Orlandi | 251/304 X |
| 4,948,095 | 8/1990 | Campau | 251/304 X |

*Primary Examiner*—John Fox
*Attorney, Agent, or Firm*—Bacon & Thomas, PLLC

[57] ABSTRACT

The present invention relates to an improved disk-type faucet that can be used to replace the ball-type faucet. The faucet includes a switching cylinder that can be rotationally disposed within the housing. The switching cylinder includes a controlling stem atop. The switching cylinder further includes a pair of annular grooves that are located below the controlling stem and each of them being disposed with an O-ring, respectively. The lower end of the switching cylinder includes a semicircular tab and a resilient plate for blocking the water flow. The semicircular tab is further enveloped with a bushing that is fixedly fastened by the resilient plate. By the biasing action of the resilient tab, the bushing and the resilient plate are provided with an allowable movement within the housing such that the wearing resulted from over-tight can be therefore prevented and the manipulation can be more conveniently conducted to open or close the faucet. Besides, the housing is integrally formed with threaded portions that can be more conveniently assembled and used to replace the ball-type faucet. The faucet features a compact and simplified configuration that may reduce the manufacturing cost.

5 Claims, 3 Drawing Sheets

DISK-TYPE FAUCET

FIELD OF THE INVENTION

The present invention relates to an improved disk-type faucet in which the ball valve can be readily replaced by a disk-type cylinder. The faucet includes a switching cylinder that can be rotationally disposed within the housing. The switching cylinder includes a controlling stem atop. The switching cylinder further includes a pair of annular grooves that are located below the controlling stem and each of them being disposed with an O-ring, respectively. The lower end of the switching cylinder includes a semicircular tab and a resilient plate for blocking the water flow. The semicircular tab is further enveloped with a bushing that is fixedly fastened by the resilient plate. The switching cylinder can be directly inserted into the housing through an opening at front end. The switching cylinder can be rotated such that the bushing and the resilient plate can be used to open or close the faucet. The housing and the threaded portion can be integrally formed and this is superior than the conventional ball-type faucet in which the housing and the threaded shall be separately assembled to install the ball valve. Besides, by the biasing action of the resilient plate, the bushing and the resilient plate is provided with an allowable movement within the housing such that the wearing resulted from over-tight can be therefore prevented and the manipulation can be more conveniently conducted to open or close the faucet. Besides, the housing is integrally formed with threaded portions that can be more conveniently assembled and used to replace the ball-type faucet. The faucet features a compact and simplified configuration that may reduce the manufacturing cost.

DESCRIPTION OF THE PRIOR ART

As shown in FIG. 1, the conventional ball-type faucet generally includes a housing A, threaded portion B, ball valve C, and switching handle D. Those components shall be made separately firstly, then the ball valve C is firstly disposed within the housing A. The water inlet is provided with a threaded portion A1 that can be engaged with the inner threaded portion B1 of the threaded portion B. And finally, the assembling of the ball valve C is completed. Furthermore, the switching handle D shall be aligned with a recess C1 and inserted into the housing A. Only by this arrangement, the ball valve C can be rotationally moved within the housing A.

However, the ball valve C shall be performed with a lot of machining processes, for example, the housing A shall be machined with an inlet and outlet passages and the ball valve C shall be machined with a recess C1. Then those components can be assembled through the following processes, i.e. inserting the ball valve C into the housing A; attaching the switching handle to the recess C1 of the ball valve C; and engaging the threaded portion B and the housing A. Apparently it shall take a laborious assembling work. The manufacturing cost is therefore high and can not be lowered.

SUMMARY OF THE INVENTION

It is the objective of this invention to provide an improved disk-type faucet in which the ball-type faucet can be readily replaced.

In order to achieve the objective set forth, an improved disk-type faucet that can be used to replace the ball-type faucet is provided. The faucet includes a switching cylinder that can be rotationally disposed within the housing. The switching cylinder includes a controlling stem atop. The switching cylinder further includes a pair of annular grooves that are located below the controlling stem and each of them being disposed with an O-ring, respectively. The lower end of the switching cylinder includes a semicircular tab and a resilient plate for blocking the water flow. The semicircular tab is further enveloped with a bushing that is fixedly fastened by the resilient plate. A handle is attached to the switching cylinder to rotate the switching cylinder between a first position in which the water flow is blocked and a second position in which the water is allow to flow. By the biasing action of the resilient tab, the bushing and the resilient plate are provided with an allowable movement within the housing such that the wearing resulted from over-tightness can be therefore prevented and the manipulation can be more conveniently conducted to open or close the faucet. Besides, the housing is integrally formed with threaded portions that can be more conveniently assembled and used to replace the ball-type faucet. The faucet features a compact and simplified configuration that may reduce the manufacturing cost.

BRIEF DESCRIPTION OF DRAWINGS

In order that the present invention may more readily be understood the following description is given, merely by way of example with reference to the accompanying drawings, in which.

DETAILED DESCRIPTION OF PREFERRED EMBODIMENT

Figure 2:
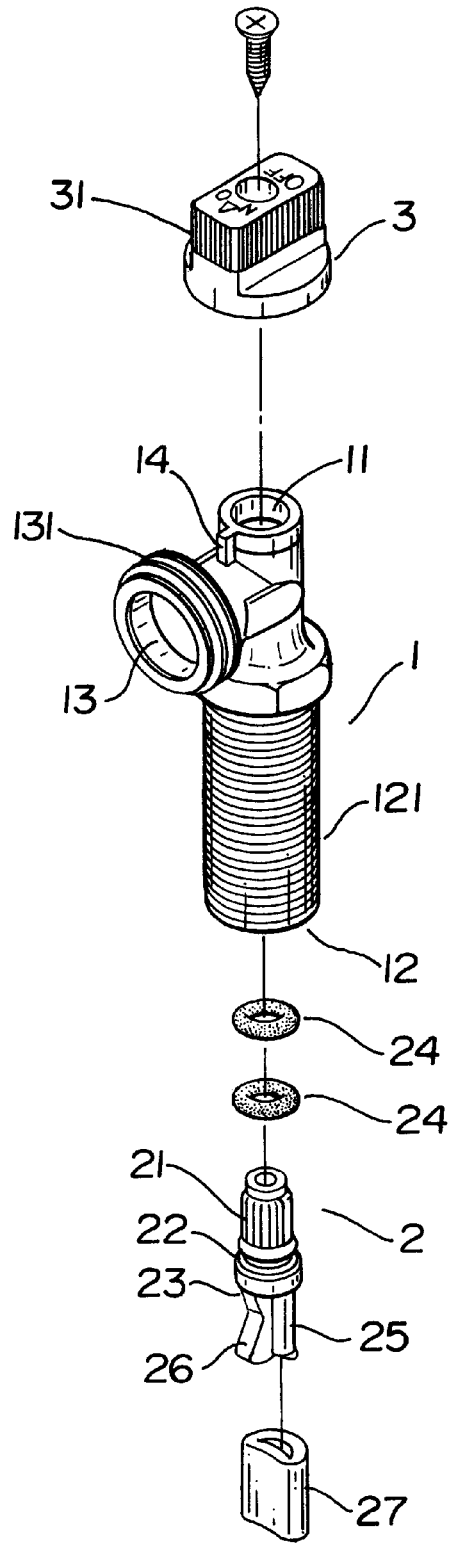
FIG. 2 is an exploded view of the disk-type faucet made according to the present invention.
Figure 3A:
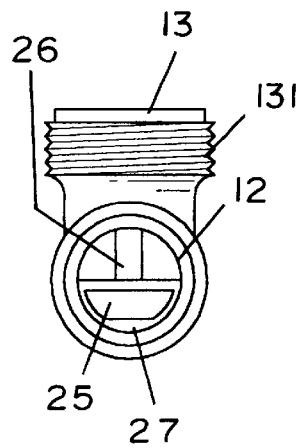
FIG. 3A is an end view of the handle in which the faucet is set to supply water.
Figure 3:
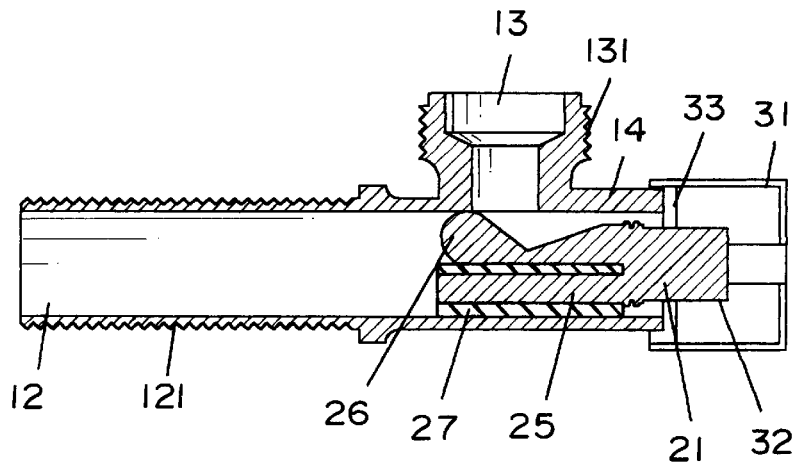
FIG. 3 is a cross sectional view in which the disk-type faucet is used to supply water.
Figure 4A:
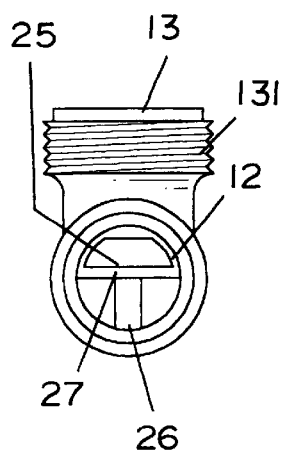
FIG. 4A is an end view of the handle in which the faucet is set to supply water.
Figure 4:
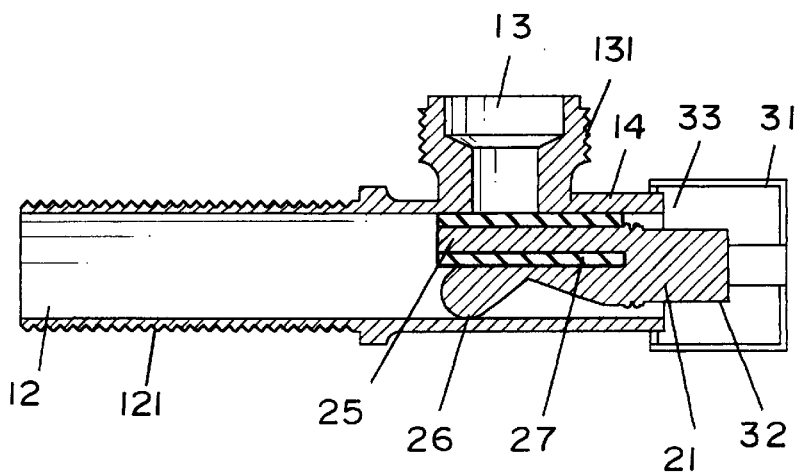
FIG. 4 is a cross sectional view in which the disk-type faucet is set to block the water.

Referring to FIGS. 2, 3, and 4, the disk-type faucet made according to the present invention generally comprises a tubular housing 1 having threaded portions at out wall, a switching cylinder 2, and a handle 3.

The housing 1 has a tubular shape that is forged and defining a passage therethrough. The front end of the housing 1 includes an opening 11 for inserting thereof the switching cylinder 2. The rear end of the housing 1 is used for water inlet 12 and is provided with threaded portions 121 at out wall. The top surface of the front end 11 includes a water outlet 13 and it includes threaded portions 131 at out wall.

The switching cylinder 2 includes a controlling stem 21 at front end. The switching cylinder 2 further includes a pair of annular grooves 22, 23 below the controlling stem 21 and each of the grooves 22, and 23 are disposed with an O-ring 24, respectively. The lower end of the switching cylinder 2 includes a semicircular tab 25 and a resilient plate 26 for blocking the water flow. The semicircular tab 25 is further enveloped with a bushing 27 that is fixedly fastened by the resilient plate 26.

The handle 3 has a round shape and is provided with a ridge 31 for readily holding by the user. The bottom of the handle 3 includes a retaining recess 32 that can be engaged with the controlling stem 21 of the switching cylinder 2. The outer peripheral of the handle 3 is further provided with stopper 33 that can be interfered by a block 14 disposed at the opening 11 of the housing 1.

In assembling, the switching cylinder 2 can be directly inserted into the opening 11 of the housing 1. Then the handle 3 can be further mounted onto the controlling stem 21 of the controlling cylinder 2. Accordingly, when the handle 3 is rotated, the controlling cylinder 3 can be rotated such that the semicircular tab 25 and the resilient plate 26 can be switched between a first position in which the water flow is blocked and a second position in which the water is allow to flow. The overall configuration is simplified.

Figure 1:
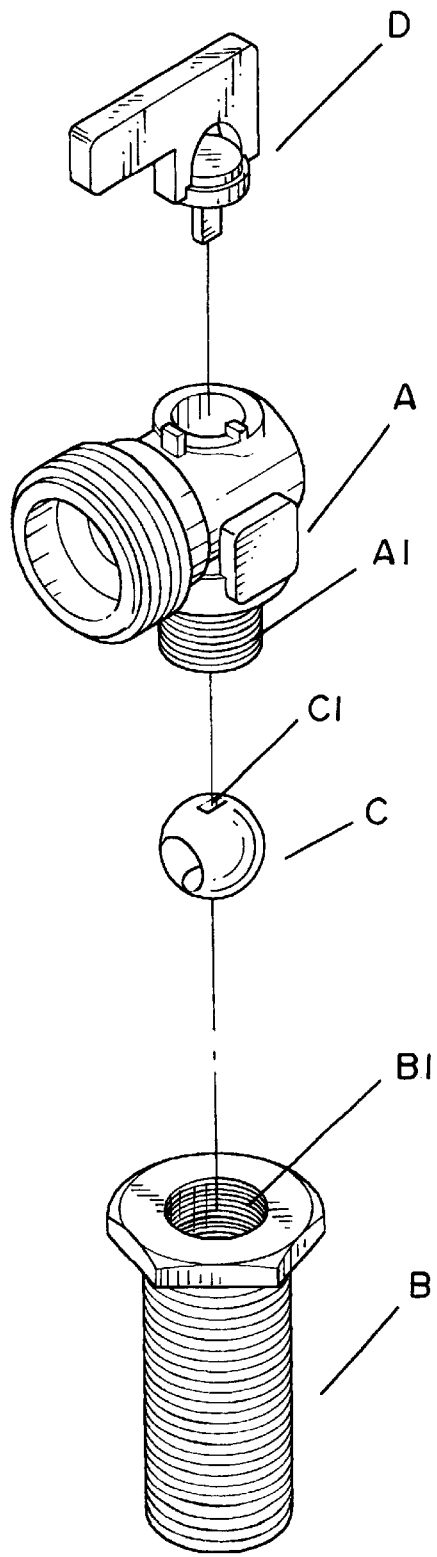
FIG. 1 is an exploded view of a conventional faucet.

Please referring to FIGS. 1 and 2, as compared with the conventional faucet that includes a housing A and a threaded portion B, the housing 1 of the present invention can be integrally molded and the manufacturing process is simplified. Furthermore, in assembling, the switching cylinder 2 can be readily inserted into the housing 1 through the opening 11. The assembling work is simplified.

Referring to FIGS. 3, 3A, 4, and 4A, when the bushing 27 is enveloped onto the semicircular tab 25, it can be fixedly fastened by the resilient plate 26. By this arrangement, when the switching cylinder 2 is inserted into the housing 1 via the opening 11, the bushing 27 will not be removed or fallen off. On the other hand, by the biasing action of the resilient plate 26, the bushing 27 and the resilient plate 26 may have an allowable movement within the housing 1. Accordingly, the wearing resulted from over-tight can be therefore prevented. Besides, the manipulation can be more conveniently conducted to open or close the faucet.

While particular embodiment of the present invention has been illustrated and described, it would be obvious to those skilled in the art that various other changes and modifications can be made without departing from the spirit and scope of the invention. It is therefore intended to cover in the appended claim all such changes and modifications that are within the scope of the present invention.

I claim:

1. An improved disk-type faucet for controlling water flow comprising a tubular housing having threaded portions, a switching cylinder within said housing and rotatable between a first closed position blocking flow of water and a second open position allowing flow of the water, said switching cylinder having a top portion and lower portion, said top portion including a control stem, a handle attached to said control stem for rotating said switching cylinder between said open and closed positions, said switching cylinder further including a pair of annular grooves located below said control stem and each disposed with an O-ring, the lower portion of said switching cylinder including a tab having a semicircular cross section and a resilient plate for controlling water flow, said tab being further enveloped with a bushing that is fixedly fastened by said resilient plate to said tab by a biasing action of said resilient plate, said bushing and said resilient plate move within said housing whereby wear resulting from over-tightness is prevented.

2. The faucet of claim 1 wherein said tubular housing is integrally formed with said threaded portions.

3. The faucet of claim 1 wherein said tubular housing has threaded portions on the the outer wall of said housing.

4. The faucet of claim 2 wherein said tubular housing is integrally formed with said threaded portions and has a threaded outlet for the water.

5. The faucet of claim 4 wherein said handle has a round shape and is provided with a ridge for holding by the user.

\* \* \* \* \*